3,149,127
PRODUCTION OF TRIOXANE
Rolf Platz, Mannheim, Germany, assignor to Badische Anilin- & Soda-Fabrik Aktiengesellschaft, Ludwigshafen (Rhine), Rhineland-Pfalz, Germany
No Drawing. Filed July 10, 1962, Ser. No. 208,948
Claims priority, application Germany July 14, 1961
5 Claims. (Cl. 260—340)

This invention relates to a process for the production of 1,3,5-trioxane, often simply referred to as trioxane. More specifically, this invention relates to a method of producing 1,3,5-trioxane wherein the formation of formaldehyde polymers is essentially avoided.

It is known that 1,3,5-trioxane is formed from concentrated aqueous formaldehyde solutions in the presence of acid catalysts. The product is conveniently separated from the reaction mixture in the form of an azeotrope with water, which boils at 91.3° C. and contains 70% by weight of trioxane and 30% of water (U.S. Patent No. 2,347,447). The trioxane is recovered from the distillate by extraction with a solvent which is immiscible with water and by subsequent fractional distillation of the organic phase. A disadvantage of this process is that during the distillation of the trioxane-water azeotrope more or less large amounts of formaldehyde, depending on the composition of the reaction mixture, also pass over (see U.S. patent specification No. 2,347,447, p. 2, left-hand column, table). This formaldehyde is readily deposited in colder parts of the apparatus as a polymer and thus causes obstructions in pipe lines and similar parts of small cross-section. The operation must then be interrupted and the apparatus cleared of the formaldehyde polymer, suitably by the action of steam. Apart from the undesirable interruption of the operation, the process is also combined with a considerable loss of formaldehyde. The yield of trioxane, with reference to reacted formaldehyde, is only 80% of the theoretical yield.

It is an object of the invention to provide a process for the production of 1,3,5-trioxane from formaldehyde wherein the formation of formaldehyde polymers is avoided. It is another object of the invention to provide a process for the production of 1,3,5-trioxane wherein considerably higher yields are achieved than in processes of the prior art. It is a further object to provide a process for the production of 1,3,5-trioxane which, unlike processes heretofore known, can be operated continuously for prolonged periods without interruption.

These objects and advantages are achieved by maintaining an aqueous formaldehyde solution with an acid catalyst at a temperature of between 0° and 200° C. and distilling off the trioxane formed, said distilling being performed in the presence of a lower alkanol, a hemiformal thereof or mixtures of these compounds.

With the new process there is practically no deposition of polymeric formaldehyde in the apparatus for the working up of the reaction mixture even after months of operation. Compared with the known methods, the yields are considerably increased. In general, they lie above 99% of the theoretical yields. Surprisingly, the formation of trioxane from formaldehyde is not impaired by the addition of methanol, although in view of U.S. Patent No. 2,465,489 an addition of methanol would have been expected to prevent the formation of trioxane.

As usual, the formaldehyde is employed in concentrated aqueous solution. 30 to 90% by weight aqueous solutions are employed with advantage. Especially favorable results are obtained when about 60% solutions are employed. When the formaldehyde concentration falls below about 35% on account of the formation of trioxane and the reduction in strength resulting from formaldehyde distilling over together with the trioxane, it is suitably restored to the initial value. This can be done by adding solid polyoxymethylene or by withdrawing part of the impoverished aqueous solution and replacing it with fresh formaldehyde of high concentration. The impoverished formaldehyde solution withdrawn can then be reconcentrated to a formaldehyde content of around 60% by distilling off water under reduced pressure.

The acid catalysts to be used are known in the art. Useful catalysts are strong or medium strong mineral acids, so far as they do not react with the formaldehyde or other compounds present in the reaction mixture. Strong mineral acids are particularly useful. Examples of suitable mineral acids are sulfuric acid, perchloric acid and phosphoric acid.

Further it is possible to employ strong or medium strong organic acids, such as aromatic sulfonic acids, especially benzenesulfonic acids and their homologs, e.g., toluenesulfonic acids.

Furthermore, it is possible to employ solid ion exchange resins with strong or medium strong acid properties, e.g., resins of this kind containing free sulfonic acid groups.

The amount of catalyst depends on the type of acid catalyst used. For example, when using sulfuric acid it is advisable to employ about 0.1 to 7%, preferably about 2%, by weight with reference to the reaction mixture. Other acids should be used in such an amount that the same acidity of the reaction mixture is set up as when using 0.1 to 7% sulfuric acid.

It is well known that the formation of trioxane in aqueous formaldehyde solution is an equilibrium reaction. Equilibrium is set up sufficiently rapidly in the presence of the said catalysts at temperatures between 0° and 200° C. It is advantageous to maintain a temperature between 85° and 110° C. and constantly shift the equilibrium by removing the trioxane formed from the reaction mixture by distillation. When working under atmospheric pressure, the temperature of the reaction mixture is about 92° C. Increased or reduced pressure may also be used, although this does not offer any special advantages.

It is an essential feature of the process according to the invention that the distillation of the 1,3,5-trioxane from the reaction mixture is performed in the presence of a lower alkanol or hemiformal thereof. In other words, during distillation such an alkanol or hemiformal must be present in the liquid boiling mixture, in the vapors above this mixture, and in the cooling device for the vapors. Suitable lower alkanols are methanol and ethanol. The use of methanol is preferred, since this alcohol most reliably prevents the deposition of formaldehyde polymers and does not undergo any change in the acid reaction mixture. Instead of the alcohols the hemiformals thereof may be employed.

The amounts in which the alcohol or the hemiformal thereof are added depend essentially on the concentration of the formaldehyde in the reaction mixture. Advantageously, these amounts lie between 0.5 and 5 parts by weight per part of trioxane distilled off. It will be understood that the amount of alcohol necessary under given conditions to prevent deposition of solid formaldehyde polymers is smaller than the amount of hemiformal necessary to produce the same result. The alkanol or hemiformal added is present in sufficient quantity when deposition of solid polymeric formaldehyde cannot be observed in any part of the apparatus.

Under the conditions described the trioxane distils off in the form of an azeotrope which boils at 92° C. under atmospheric pressure.

The lower aliphatic alcohol or hemiformal thereof may be added to the reaction mixture before and/or during the separation of the trioxane by distillation. In the case of batchwise production of trioxane, the concentrated aqueous formaldehyde solution can, for example, be maintained at the reaction temperature for some time with addition of the acid catalyst, after which the alkanol or the hemiformal is added to the mixture and then the trioxane distilled off. Likewise, it is possible to add the lower alkanol or its hemiformal to the reaction mixture at the start. The conversion may be effected continuously by carrying out the reaction in the presence of the said alkanol or hemiformal, continuously removing the resulting trioxane in the form of an azeotrope with water and the alcohol and maintaining the suitable concentrations of formaldehyde and alcohol or its hemiformal in the reaction mixture by continuous addition of the said substances.

The distillate, which contains trioxane, water, the lower alkanol and formaldehyde, the two last mentioned substances being at least partially in the form of the hemiformal, may be worked up in customary manner, i.e., as described in Chem. Eng. News, vol. 21,1943, pp. 1250/51, by extraction of the trioxane with the aid of a solvent which is immiscible with water. Suitable solvents are, for example, chlorinated aliphatic or aromatic hydrocarbons, cycloalkanes, aromatic hydrocarbons or aliphatic ethers. Obviously, it is recommendable to use an extraction agent whose boiling point differs considerably from that of trioxane. Examples of suitable solvents are: methylene chloride, chloroform, cyclohexane, benzene, chlorobenzene or diethyl ether. The remaining aqueous mixture has a boiling point of from 96° to 97° C. at atmospheric pressure and contains chiefly the hemiformal of the alcohol employed. In the continuous or repeated batch-wise production of trioxane this mixture is added to the acid reaction solution before or during distillation of the trioxane azeotrope. Fresh alcohol is necessary only at the commencement of the process, until such time as the said mixture is available.

The trioxane is recovered by evaporation of the extraction agent and distillation of the residue. It is however difficult to remove relatively small amounts of monomeric formaldehyde which obstinately follow the trioxane and often considerably impair the further use of the latter. It has already been recommended to treat the contaminated trioxane with ammonia which converts the formaldehyde into hexamethylenetetramine. Then, however, the trioxane is contaminated with this substance, which is difficulty separable. According to another known process the formaldehyde is removed by washing the trioxane crystals with cold methanol or ethanol. This purification, however, must be repeated several times and, on account of the good solubility of the trioxane in alcohol, is combined with considerable losses. Moreover, trioxane treated in this way contains alcohols, which have to be removed in another distillation. The small amounts of formaldehyde which accompany the trioxane may be removed reliably and considerably more simply than heretofore known if the residue remaining after the elimination of the extraction agent is treated with a base, either before or during the subsequent distillation. By this treatment the formaldehyde is converted in a short time into a dark brown resin. Surprisingly, the trioxane is not affected by the base.

The preferred bases are those which are stronger bases than strontium hydroxide. For example, sodium hydroxide, potassium hydroxide or barium hydroxide may be used. Instead of the bases it is also possible to add the corresponding oxides or the free metals from which the bases are derived. Instead of said bases, oxides or metals any other compound yielding the bases under the conditions of the process can be employed. Such compounds are, for example, amides, hydrides and acetylides. Suitably these bases or basic-reacting additives are employed in amounts from 0.1 to 0.5% by weight, based on the weight of the residue to be distilled. However, larger quantities, such as 10% by weight, may also be employed. The treatment may take place before or during the distillation, suitably at a temperature of from 80° to 110° C. In general, the residue is heated with the base for a short time, e.g., 5 minutes at 110° C. Formaldehyde is not detectable in the distilled trioxane, either by smell or by analysis. The product has rather the pure chloroform-like smell of trioxane.

The treatment with the base may alternatively take place directly after the extraction of the distillate which is obtained from the reaction mixture, i.e., before the elimination of the extraction agent. This method, however, entails higher losses of formaldehyde, since in this case a part of the formaldehyde, which is removed by distilling off the extraction agent, is also converted into the said resin. If, on the other hand, the treatment with the base is effected after the elimination of the extraction agent, only the portion (about 0.5% by weight) of formaldehyde which is dissolved in the trioxane is converted to resin.

The pure trioxane, obtained by distillation, melts at 64° C. It serves as initial material for the production of polyoxymethylene of high molecular weight, which is employed as a plastic material.

The invention will now be further illustrated by the following examples, in which the parts and percentages are by weight, unless otherwise stated. Parts by weight are related to parts by volume as the gram is to the cubic centimeter.

*Example 1*

1170 parts of a 60% aqueous formaldehyde solution and 25 parts of concentrated sulfuric acid are heated to boiling (internal temperature 100° C.). Within a period of 5 hours, 237 parts of methanol is introduced into the mixture. The escaping steam passes upwardly through a packed column to a reflux condenser filled with water heated to 92° C. The higher boiling components are condensed there and return to the column at the rate of 150 parts by volume per hour. The steam passing over at 92° C. is completely condensed in a cooling condenser.

The condensate (800 parts) is extracted twice in countercurrent with 208 parts of methylene chloride each time. The first solution is then fractionally distilled in a packed column. Next the methylene chloride is removed at 41.5° C., causing the bottoms temperature to rise gradually to 100° C. After a small forerun of methylene chloride and trioxane, the trioxane contaminated with small amounts of formaldehyde passes over at 114.5° C. The product is kept liquid by heating the discharge piping. The forerun of trioxane and methylene chloride is combined with the second extract, which is used for the first extraction of the following batch.

250 parts of 92% solid polyoxymethylene is fed to the reaction vessel to restore the concentration of the formaldehyde in the reaction mixture to about 60%. The further procedure is as described above, except that instead of pure methanol, the aqueous phase, which remains after the extraction of the trioxane with methylene chloride, is added to the mixture within a period of 5 hours.

When steady-state conditions have been reached, there is obtained from each batch, 239 parts of trioxane of the melting point 63° to 64° C., which product contains 228 parts of pure trioxane. The yield, with reference to pure paraformaldehyde, is 99% of the theoretical yield.

Substantially the same yield of trioxane is obtained by adding at the start, instead of methanol, an equivalent amount of the hemiformal of methanol, B.P. 96° C. (760 mm. Hg).

*Example 2*

The procedure is as described in Example 1, but the residue which remains after elimination of the extraction agent is treated with 5 parts of sodium hydroxide and the mixture is kept at 100° to 110° C. for 5 minutes. On distillation there is obtained 228 parts of trioxane of the boiling point 114° C., which product solidifies into crystals of the melting point 64° C. The penetrating smell of formaldehyde has completely disappeared. Neither can any formaldehyde be detected with ammoniacal silver nitrate solution (Tollens reagent). With the so-called Lebbin's reagent, an alkaline resorcinol solution, the formaldehyde content is shown to be less than 0.1 part per million.

An equally good result is obtained if instead of sodium hydroxide equivalent amounts of lithium hydroxide, potassium hydroxide, barium hydroxide, sodium, potassium, lithium hydride or sodium acetylide is used.

*Example 3*

The procedure is as described in Example 1, but instead of sulfuric acid 2% is used of each of the following: Perchloric acid, p-toluenesulfonic acid and an acid ion exchanger containing sulfo groups (Dowex 50 or Levatit S 100). The yields are 99% of the theoretical in all cases.

What I claim is:

1. A process for the production of 1,3,5-trioxane which comprises maintaining an aqueous formaldehyde solution with an acid catalyst for conversion of formaldehyde to 1,3,5-trioxane at a temperature of between 0° and 200° C., and distilling off the trioxane formed, said distilling being performed in the presence of 0.5–5 parts per part by weight of trioxane distilled off a compound selected from the group consisting of methanol, ethanol, hemiformals of said alkanols and mixtures of said compounds.

2. A process as claimed in claim 1 wherein the temperature at which the aqueous formaldehyde solution is maintained is between 85° and 110° C.

3. A process as claimed in claim 1 wherein said compound is methanol.

4. A process as claimed in claim 1 in which said trioxane which is distilled off is recovered in the form of trioxane contaminated by a small amount of monomeric formaldehyde, adding to said contaminated trioxane 0.1–10% by weight, based on said contaminated trioxane, of a base selected from the group consisting of hydroxides of the metals sodium, potassium, lithium and barium, oxides of said metals, said metals as free metals, lithium hydride and sodium acetylide, and distilling substantially pure trioxane off said contaminated trioxane containing said base.

5. A process as claimed in claim 1 wherein said compound is a mixture of methanol and the hemiformal of methanol.

References Cited in the file of this patent
UNITED STATES PATENTS

| | | |
|---|---|---|
| 2,304,080 | Frank | Dec. 8, 1942 |
| 2,347,447 | Walker | Apr. 25, 1944 |
| 2,465,489 | Sokol | Mar. 29, 1949 |
| 2,690,994 | McCants | Oct. 5, 1954 |